(12) United States Patent
Quinquis et al.

(10) Patent No.: US 10,455,263 B2
(45) Date of Patent: Oct. 22, 2019

(54) METHOD AND APPARATUS FOR BANDWIDTH OPTIMIZATION USING STAGGERCAST

(71) Applicant: INTERDIGITAL CE PATENT HOLDINGS, Paris (FR)

(72) Inventors: Cyril Quinquis, Melesse (FR); Didier Guillemot, Vern-sur-Seiche (FR); Franck Aumont, Vern sur Seiche (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/098,189

(22) PCT Filed: May 11, 2017

(86) PCT No.: PCT/EP2017/061389
§ 371 (c)(1),
(2) Date: Nov. 1, 2018

(87) PCT Pub. No.: WO2017/194702
PCT Pub. Date: Nov. 16, 2017

(65) Prior Publication Data
US 2019/0149870 A1 May 16, 2019

(30) Foreign Application Priority Data
May 13, 2016 (EP) .................................... 16305559

(51) Int. Cl.
*H04N 21/262* (2011.01)
*H04L 1/08* (2006.01)
(Continued)

(52) U.S. Cl.
CPC ......... *H04N 21/26275* (2013.01); *H04L 1/08* (2013.01); *H04L 65/4084* (2013.01);
(Continued)

(58) Field of Classification Search
CPC ....... H04N 21/23439; H04N 21/26275; H04N 1/08; H04N 1/1816
See application file for complete search history.

(56) References Cited

U.S. PATENT DOCUMENTS 8,347,189 B2    1/2013  Ihara
8,699,564 B2 *  4/2014  Cooper .................... H04L 1/02
                                                 375/240.01
(Continued)

FOREIGN PATENT DOCUMENTS

EP           2894860         5/2008

OTHER PUBLICATIONS

Linawati et al: "Statistical multiplexing strategies for self-similar traffic",Wireless and Optical Communications Networks, 2008. WOCN '08. 5th IFIPInternational Conference on, IEEE, Piscataway, NJ, USA, May 5, 2008 (May 5, 2008), pp. 1-5.
(Continued)

*Primary Examiner* — James R Marandi
(74) *Attorney, Agent, or Firm* — Joseph J. Opalach

(57) ABSTRACT

In a communication system and method using staggercasting, the bitrates of both staggercast and base streams may be highly variable to fulfill, for example, some quality demands. In some circumstances such as transport or bandwidth managements, variable bitrates may have some drawbacks or may not be cost effective. Accordingly, the present principles aim to level the sum of the two bitrates and/or to avoid exceedingly high or low bitrate intervals by reordering the packets of the staggercast stream.

15 Claims, 8 Drawing Sheets

(51) Int. Cl.
 *H04N 21/2343* (2011.01)
 *H04L 29/06* (2006.01)
 *H04N 21/845* (2011.01)
 *H04L 1/18* (2006.01)

(52) U.S. Cl.
 CPC ... *H04N 21/23439* (2013.01); *H04N 21/2625* (2013.01); *H04N 21/8456* (2013.01); *H04L 1/1816* (2013.01); *H04L 65/80* (2013.01)

(56) References Cited

U.S. PATENT DOCUMENTS

| | | |
|---|---|---|
| 8,942,241 B2 | 1/2015 | Janneteau et al. |
| 2006/0082474 A1* | 4/2006 | Cooper .......... H04N 21/234327 341/50 |
| 2009/0141800 A1 | 6/2009 | Larson |
| 2010/0254489 A1* | 10/2010 | Citta .................... H04L 1/0057 375/299 |

OTHER PUBLICATIONS

International Search Report for PCT/EP17/61389 dated Jul. 13, 2017.
EP Search Report for EP16305559 dated Nov. 11, 2016.

\* cited by examiner

METHOD AND APPARATUS FOR BANDWIDTH OPTIMIZATION USING STAGGERCAST

This application claims the benefit, under 35 U.S.C. § 365 of International Application PCT/EP17/061389, filed 11 May 2017, which was published in accordance with PCT Article 21(2) on WO2017194702A1 in English and which claims the benefit of European Patent Application No. 16305559.3, filed 13 May 2016.

TECHNICAL FIELD

The present principles generally relate to communication apparatuses, methods, and computer program products, and more particularly, to reordering a staggercast stream for bandwidth optimization based on packet size conditions.

BACKGROUND OF THE INVENTION

In staggercasting, audio and/or video content is encoded and sent twice in different times, once as a main or base stream and also as a staggercast stream. The staggercast stream is sent in advance compared to the base stream, i.e., the base stream is delayed (with the staggercast delay). An illustrative staggercasting transmitter is shown in FIG. 1. The elements shown in FIG. 1 are well-known and will not be described in detail. In FIG. 1, a staggercast transmitter 100 illustratively comprises a first encoder 101 and a second encoder 102, a staggercast delay 103, a multiplexer (mux) 104, and a modulator 105.

In FIG. 1, audio and/or video content 110 is applied to inputs of encoders 101 and 102, which encode the input signal 110 to provide respectively encoded signals 111 and 112 at the outputs of the encoders 101 and 102. The first encoded signal 111 represents the staggercast stream. The second encoded signal 112 encoded by the second encoder 102 in FIG. 1 is then delayed in time by the staggercast delay 103 to provide the base or main stream 122. The staggercast delay 103 may be adjustable or fixed. As a result of the base stream 122 being delayed by the staggercast delay 103, the staggercast stream 111 is now "in advance" of the base stream 122. Mux 104 then multiplexes the base stream 122 and the staggercast stream 111 to provide an output data packet stream 123 which is subject to further signal modulation (e.g., OFDM, VSB modulation, and etc.) by a modulator 105 as needed. The output 124 of the modulator 105 is then transmitted via a transmission medium (e.g., cellular, broadcast, satellite, cable, Internet, and etc.) to a receiver as a transmitted stream. Also, the encoders 101 and 102 in FIG. 1 may perform the same type of encoding, although this is not required. That is, one encoder may perform the encoding with different modulation formats, coding rate and/or encoding standard than the other. For example, encoder 101 may be more robust and may produce an encoded stream 111 which is more error resistant than the encoded stream 112 produced by the encoder 102, and/or that encoder 101 may produce an audio stream in MP3, and encoder 102 may produce another audio stream in ACC, or vice versa.

Turning now to FIG. 2, an illustrative staggercast receiver 200 is shown. The staggercast receiver 200 comprises a demodulator 201, a demultiplexer (demux) 202, a staggercast stream selector 203 and a decoder 204. The transmitted stream 210 is first received and processed by the demodulator 201. The demodulator 201 demodulates the received RF signal and provides a demodulated output signal 221 to the demux 202. The demux 202 demultiplexes the demodulated signal 221 and provides at its outputs the staggercast stream 211 and the base or main stream 222 which have been multiplexed e.g., at the staggercast transmitter 100 shown in FIG. 1. Therefore, in case of the loss or the degradation of the transmitted stream 210 due to physical disruptions such as e.g., multipath interference or fading, a correction may be made on the receiver side.

The correction may be made, e.g., by the staggercast selector 203 using data from the staggercast stream 211 to replace, supplement or otherwise recover the degraded data in the base stream 222. For example, if the receiver 200 detects degradation in the base or main stream 222, the staggercast selector 203 may select the corresponding data packets from the staggercast stream 211 for the degraded data packets in the base stream 222, since the base stream 222 has been delayed by the staggercast delay 103 as shown in FIG. 1 and as described before. That is, missing or corrupted packets from base stream 222 may be replaced or supplemented by using the corresponding packets received earlier from staggercast stream 211. Thus, a quality of service (QoS) to a user of the staggercast communication system may be maintained and decoder 204 is able to provide a more robust or error resistant decoded stream 224.

SUMMARY OF THE INVENTION

According to the present principles, an exemplary apparatus is presented comprising: an encoder configured to provide a first signal, the first signal representing a first stream of data packets; a delay circuit configured to provide a second signal, the second signal representing a delayed stream of data packets; a processor configured to determine an average packet size over a time interval for the first stream of data packets and an average packet size over the time interval for the delayed stream of data packets; a multiplexer configured to multiplex a reordered first stream of data packets and the delayed stream of data packets; and wherein the first stream of data packets is reordered into the reordered first stream of data packets as a function of the average packet size of the first stream of data packets and the average packet size of the delayed stream of data packets.

In another exemplary embodiment, a method is presented, comprising: providing a first signal, the first signal representing a first stream of data packets; providing a second signal, the second signal representing a delayed stream of data packets; determining an average packet size over a time interval for the first stream of data packets; determining an average packet size over the time interval for the delayed stream of data packets; reordering the first stream of data packets into a reordered first stream of data packets as a function of the average packet size of the first stream of data packets and the average packet size of the delayed stream of data packets; and multiplexing the reordered first stream of data packets and the delayed stream of data packets.

In another exemplary embodiment, a computer program product stored in a non-transitory computer-readable storage medium is presented, comprising computer-executable instructions for: providing a first signal, the first signal representing a first stream of data packets; providing a second signal, the second signal representing a delayed stream of data packets; determining an average packet size over a time interval for the first stream of data packets; determining an average packet size over the time interval for the delayed stream of data packets; reordering the first stream of data packets into a reordered first stream of data packets as a function of the average packet size of the first stream of data packets and the average packet size of the delayed stream of data packets; and multiplexing the reordered first stream of data packets and the delayed stream of data packets.

In another exemplary embodiment, an apparatus is presented comprising: a demultiplexer configured to provide a first signal and a second signal, the first signal representing a first stream of data packets that has been reordered at a transmitter and the second signal representing a delayed stream of data packets; and a packet reordering unit configured to reorder the first signal representing a first stream of data packets that has been reordered at the transmitter back to an original order appearing at the transmitter, wherein the first stream of data packets has been reordered at the transmitter as a function of an average packet size of the first stream of data packets and an average packet size of the delayed stream of data packets during a time interval.

In another exemplary embodiment, a method performed by a receiver is presented, comprising: providing a first signal and a second signal, the first signal representing a first stream of data packets that has been reordered at a transmitter and the second signal representing a delayed stream of data packets; and reordering the first signal representing a first stream of data packets that has been reordered at the transmitter back to an original order appearing at the transmitter, wherein the first stream of data packets has been reordered at the transmitter as a function of an average packet size of the first stream of data packets and an average packet size of the delayed stream of data packets during a time interval.

Figure 1:
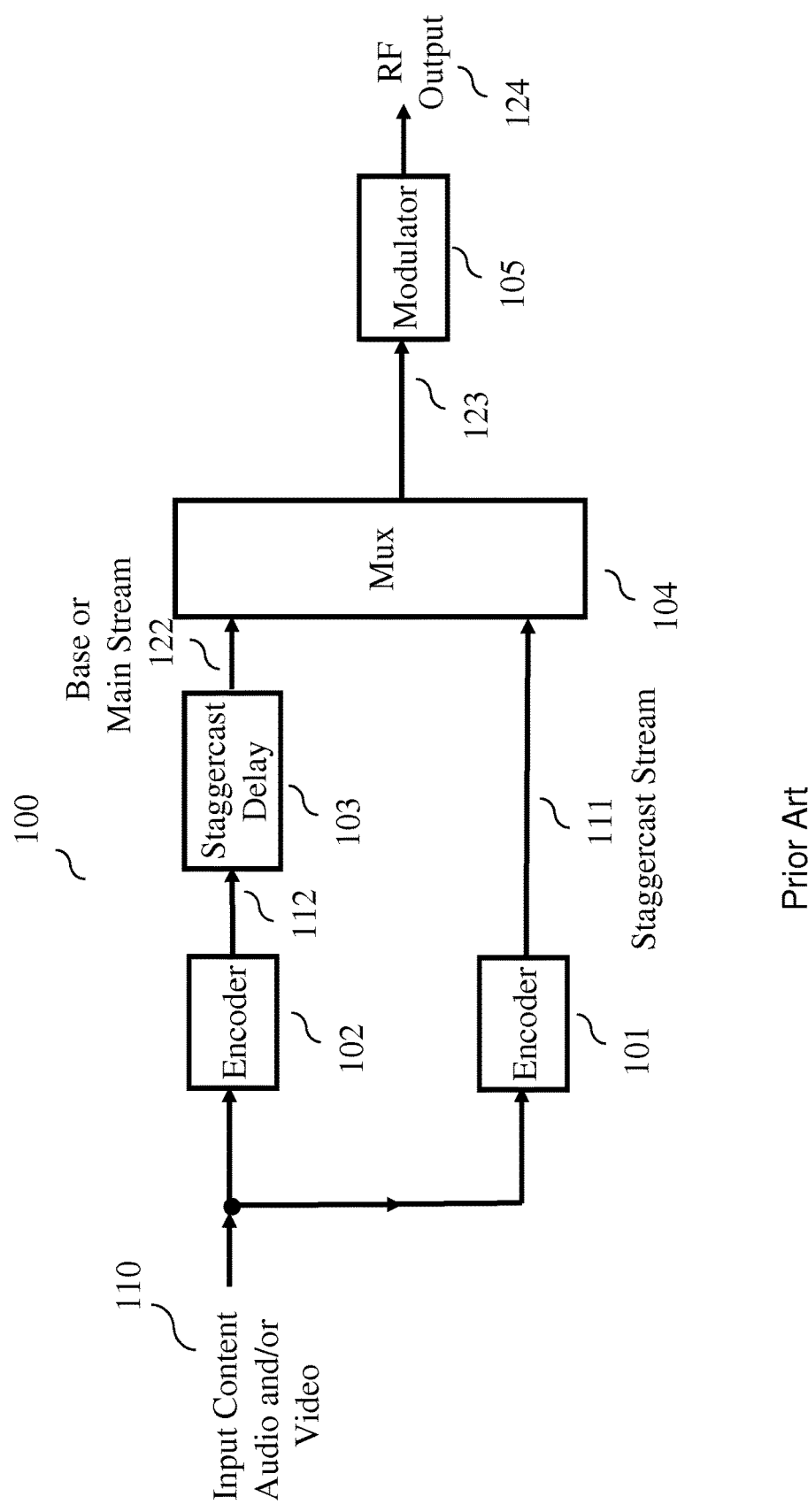
FIGS. 1 and 2 illustrate respectively a prior art transmitter and a prior art receiver for use in a staggercast system.

The examples set out herein illustrate exemplary embodiments of the present principles. Such examples are not to be construed as limiting the scope of the invention in any manner.

DETAILED DESCRIPTION

The present inventors recognize that in a transmission using the above described staggercast communication system and method, the bitrates of both the staggercast stream and the base stream may be highly variable. The variability may be due to the variability of the content being encoded or may be due to the requirement of the system to fulfill some quality demands. In some circumstances such as the need for transport or bandwidth management, variable bitrates may have some drawbacks or may not be cost effective to a content provider. These drawbacks may be accentuated at two ends of the condition when the sum of the bitrates of the first and the second signals reaches a peak rate, or when the sum is at a very low rate. For most content providers such as digital television broadcasters or internet content stream providers, the more constant the bitrate is, the better, since the providers may have to take in to account the potential simultaneous peak rates of the users when planning or sizing their network bandwidth.

In view of the above, the present inventors recognize a need to manage the resultant bitrates of the base stream and the staggercast stream. Accordingly, the present principles aim to provide a more even level for the sum of the two bitrates and/or to avoid exceedingly high or low bitrate intervals by reordering the packets of the staggercast stream. In one exemplary aspect, the present principles propose to change the actual staggercast delay parameter with the introduction of two new parameters: a minimum staggercast delay and a maximum staggercast delay for the proposed staggercast system and method.

In a further exemplary aspect, during the interval defined by the minimum staggercast delay and the max staggercast delay, the reordering mechanism may be performed. The minimum staggercast delay ensures a minimal performance of the staggercast process. The maximum staggercast delay is the usual or typical staggercast delay which would have been used to delay the base stream in a prior art staggercast system as described above in connection with FIGS. 1 and 2 above. Accordingly, with the introduction of these new parameters, content providers are able to make a trade-off between bandwidth optimization and bitstream protection using the proposed staggercast systems and methods described herewith.

Other than the inventive concept, the elements shown in the figures are well known and will not be described in detail. For example, familiarity with television broadcasting, receivers and video encoding is assumed and is not described in detail herein. As such, other than the inventive concept, familiarity with current and proposed recommendations for television (TV) standards such as ATSC (Advanced Television Systems Committee) and Digital Video Broadcasting (DVB), e.g., Digital Video Broadcasting-Terrestrial (DVB-T2) is assumed. In this regard, familiarity with the standards and recommended practices of existing ATSC system standards such as ATSC A/53, A/153, A/54, A/65, and etc. and/or the new ATSC 3.0 standards being proposed, is also assumed and not described herein. Further, other than the inventive concept, familiarity with other protocols such as the File Delivery over Unidirectional Transport (FLUTE) protocol, ROUTE/DASH, MPEG Media transport (MMT), User Datagram Protocol (UDP), Asynchronous Layered Coding (ALC) protocol, Internet protocol (IP) and Internet Protocol Encapsulator (IPE), etc., is assumed and not described herein. Similarly, other than the inventive concept, formatting and encoding methods (such as Moving Picture Expert Group (MPEG)-2 Systems Standard (ISO/IEC 13818-1), H.264, H.265 HEVC, and etc.) for generating video and transport bit streams are well-known and not described herein.

The present description illustrates the present principles. It will thus be appreciated that those skilled in the art will be able to devise various arrangements that, although not explicitly described or shown herein, embody the present principles and are included within its scope. All examples and conditional language recited herein are intended for pedagogical purposes to aid the reader in understanding the present principles and the concepts contributed by the inventors to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment", "an embodiment", "an exemplary embodiment" of the present principles, or as well other variations thereof, means that a particular feature, structure, characteristic, and so forth described in connection with the embodiment is included in at least one embodiment of the present principles. Thus, the appearances of the phrase "in one embodiment", "in an embodiment", "in an exemplary embodiment", or as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
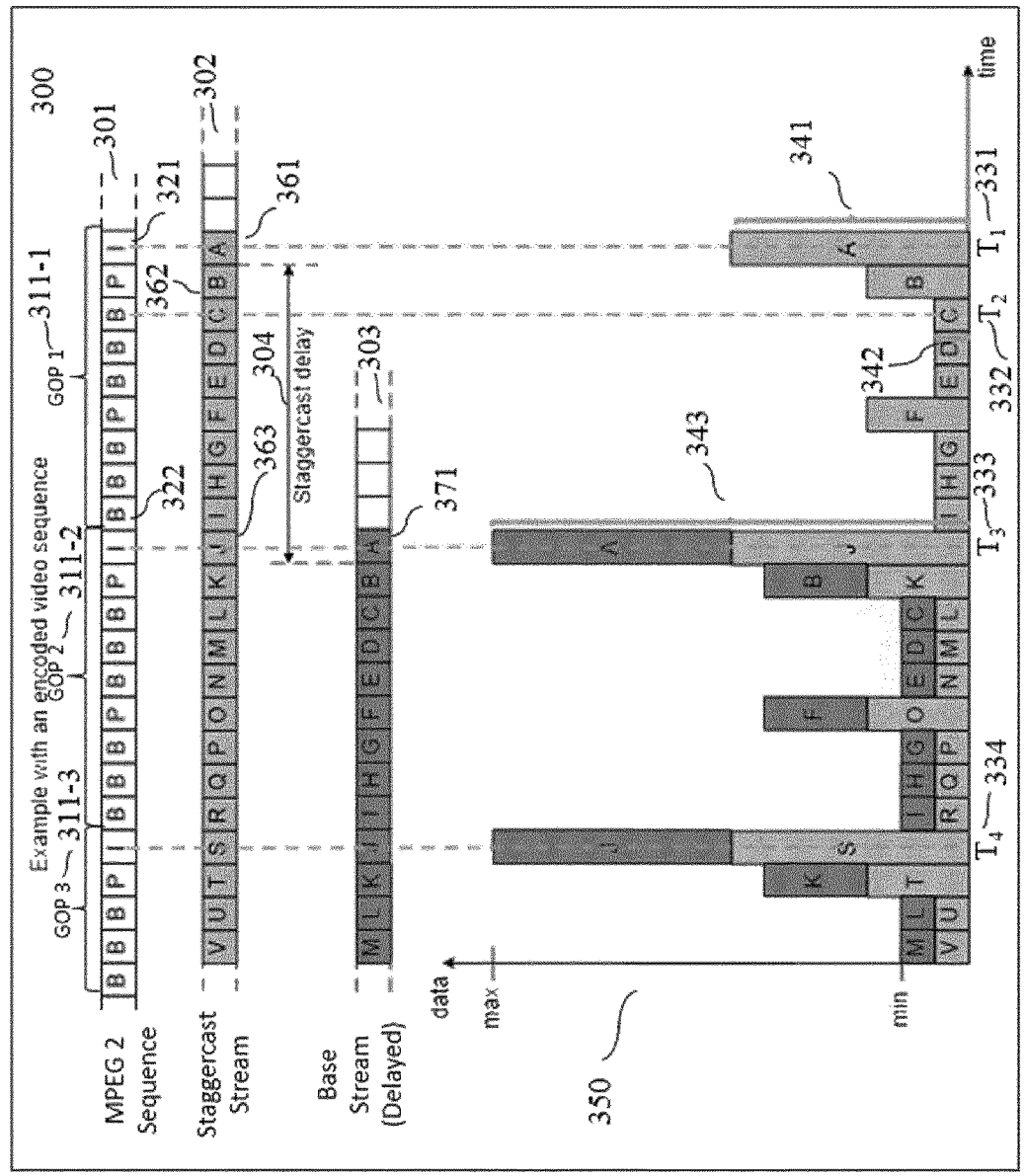
FIG. 3 illustrates a problem in the prior art staggercast system recognized by the present inventors.
Figure 4:
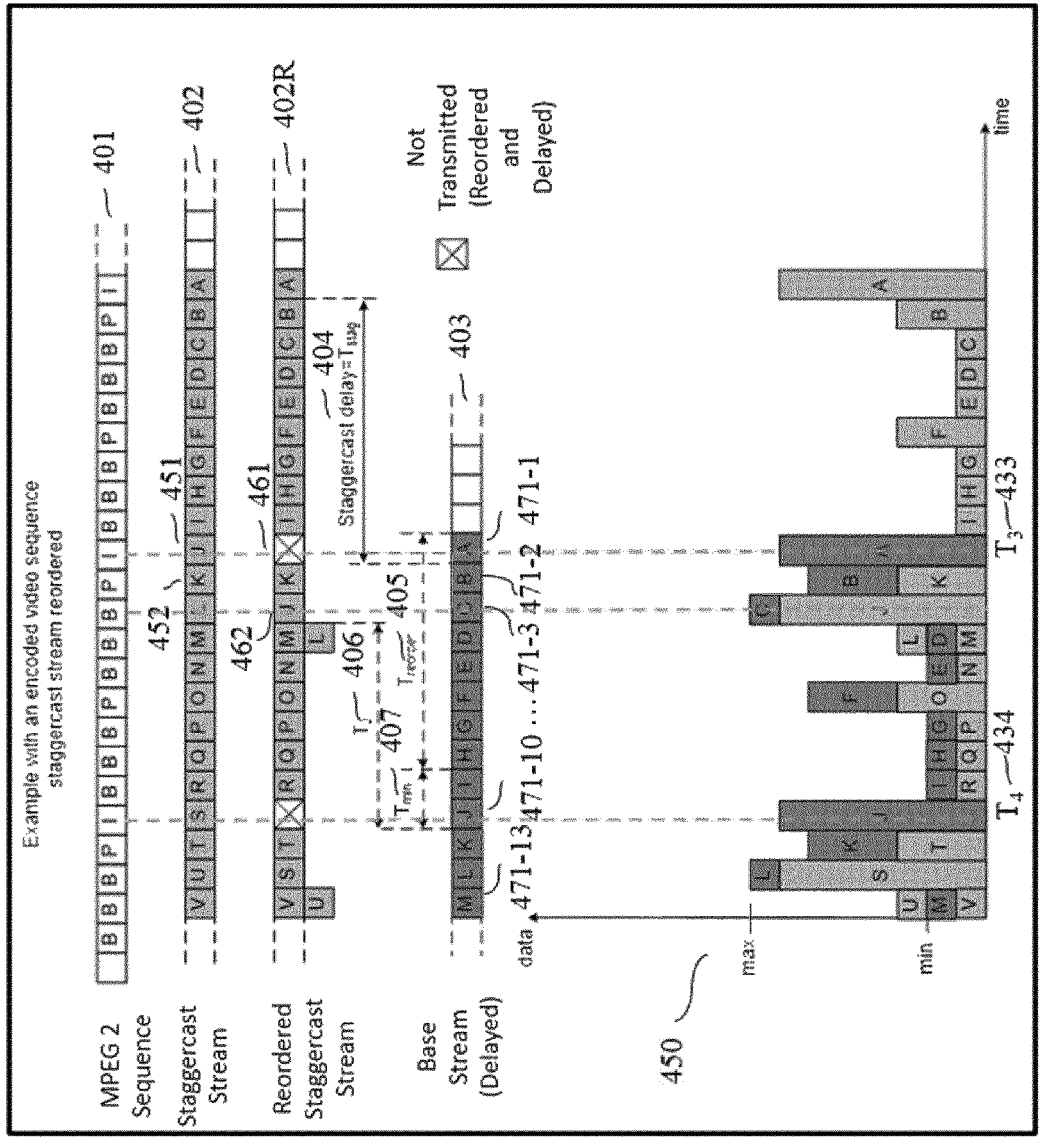
FIG. 4 illustrates advantages according to the present principles.

FIG. 3 illustrates a problem in the prior art staggercast system recognized by the present inventors. FIG. 4 illustrates the advantages provided by the present principles to solve the problem illustrated in FIG. 3. Although the illustrations in FIG. 3 and FIG. 4 are made through the use of an MPEG video encoding example, such as using an MPEG 2 Video stream, one skilled in the art may readily recognize that other video and and/or audio encoding method or system may also be used.

In FIG. 3, an MPEG 2 Video data packet stream 301 with 3 Groups of Pictures (GOPs), GOP 1 311-1 to GOP 3 311-3, is shown as being transmitted using the prior art staggercast transmitter 100 shown in FIG. 1. For example, the MPEG 2 Video data packet stream 301 has a first GOP, GOP 1 311-1, which starts with an Intra (I) frame data packet 321 and ends with a Bi-directional (B) frame data packet 322.

The same MPEG 2 input data packet stream 301 is then re-labeled alphabetically in sequence for the ease of illustration and is shown as a data packet stream 302 in FIG. 3. The data packet stream 302 also represents e.g., the first, staggercast stream 111 of the transmitter 100 shown in FIG. 1 as to be described in further detail below. Also, another packet data stream 303 in FIG. 3 represents e.g., the staggercast delayed base stream 122 shown in the transmitter 100 in FIG. 1.

As shown in FIG. 3, the stream 303 also corresponds to the staggercast stream 302 in FIG. 3 delayed by the staggercast delay time 304 in FIG. 3. As described in connection with FIG. 1 and FIG. 2 previously, the delayed data packet base stream 303 is protected by the undelayed data packet staggercast stream 302 in a typical prior art staggercast system as described above in connection with FIG. 1 and FIG. 2.

Histogram 350 on the bottom of FIG. 3 illustrates, at various instances in time (as shown on its x-axis), the cumulated data rate from both the undelayed staggercast stream 302 and the delayed base stream 303. For example, at time instance $T_1$ 331, only the data packet A 361 (which represents the I frame data packet 321 in the MPEG 2 Video stream 301) contributes to the cumulative data rate 341 shown in the histogram 350. Likewise, for example, at time $T_3$ 333, both the undelayed data packet J 363 in stream 302 and the delayed data packet A 371 in the stream 303 contribute to the cumulated data rate 343.

In the exemplary illustration of FIG. 3, the staggercast delay 304 applied to the staggercast stream 302 is the same as the duration of the first GOP in the MPEG 2 Video stream 301, namely the size of GOP 1 311-1. As a consequence, as shown in the histogram 350, the composite bitstream of the staggercast stream 302 and the base stream 303 fluctuates between high bitrates when two I frame data packets are being transmitted at the same time (e.g., at $T_3$ 333) and when only a B frame data packet is being transmitted (e.g., at $T_2$ 332).

To solve the problem illustrated in FIG. 3 as just described, the present principles propose a solution which reorders the staggercast data packet stream 302 to provide a more even data rate over time. That is, the present principles attempt to eliminate instances of high bitrates when e.g., two I frame data packets are being transmitted at the same time, and instances of very low bit rates e.g., when only a B frame data packet is being transmitted. In an exemplary embodiment as to be described in further detail below, the present principles reorder the staggercast data packet stream as a function of the average packet size of the staggercast data stream of data packets and the average packet size of the delayed, base stream of data packets.

Figure 2:
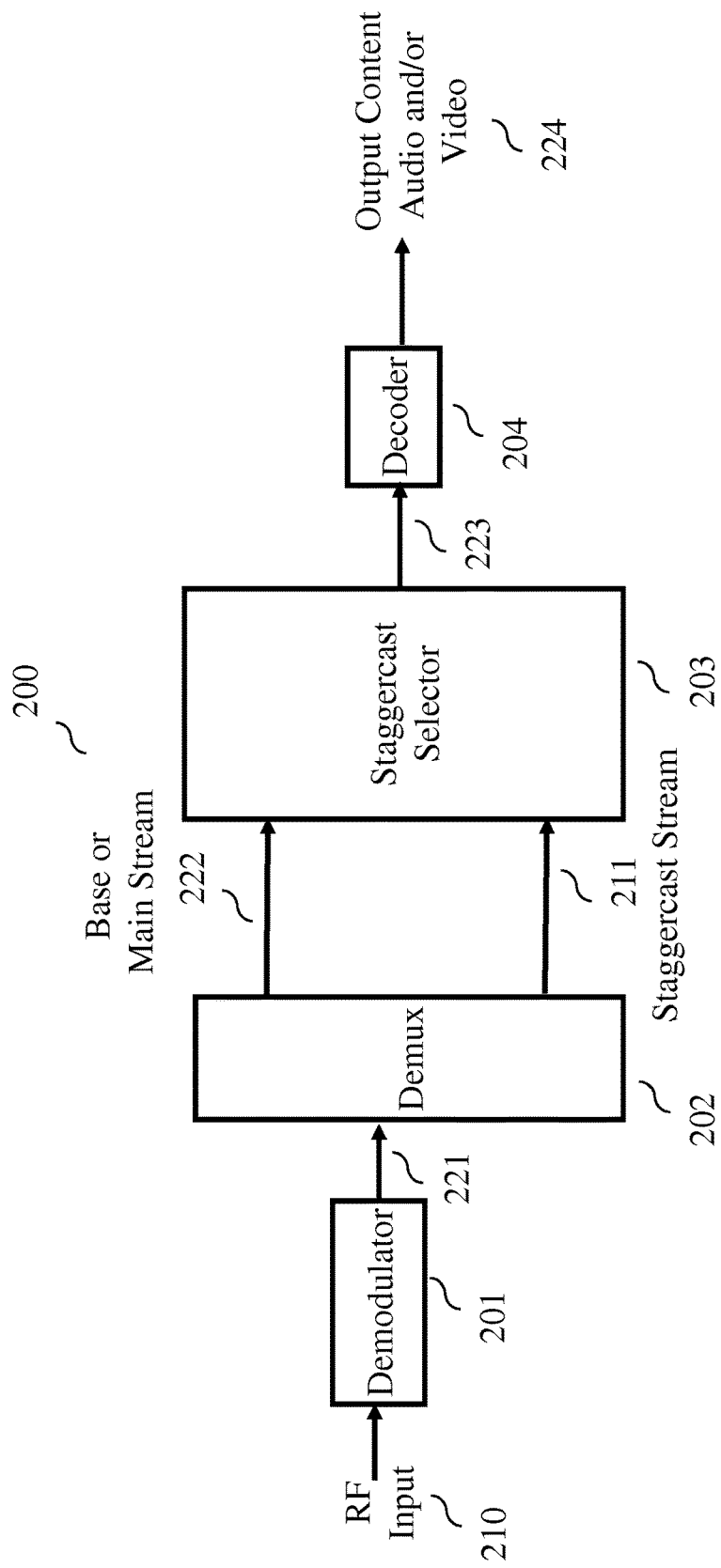

The advantages of the present principles over the existing staggercast system of FIG. 1 and FIG. 2 will now be illustrated and explained in FIG. 4. As illustrated in the histogram 450 on the bottom of FIG. 4, the present principles provide a solution such that e.g., the two peak bitrates at time instances $T_3$ and $T_4$ shown in histogram 450 of FIG. 4 have been reduced by almost 50%, compared with the same corresponding time instances $T_3$ and $T_4$ shown in FIG. 3, although the average bitrate of the combined streams remains the same as before.

Figure 7:
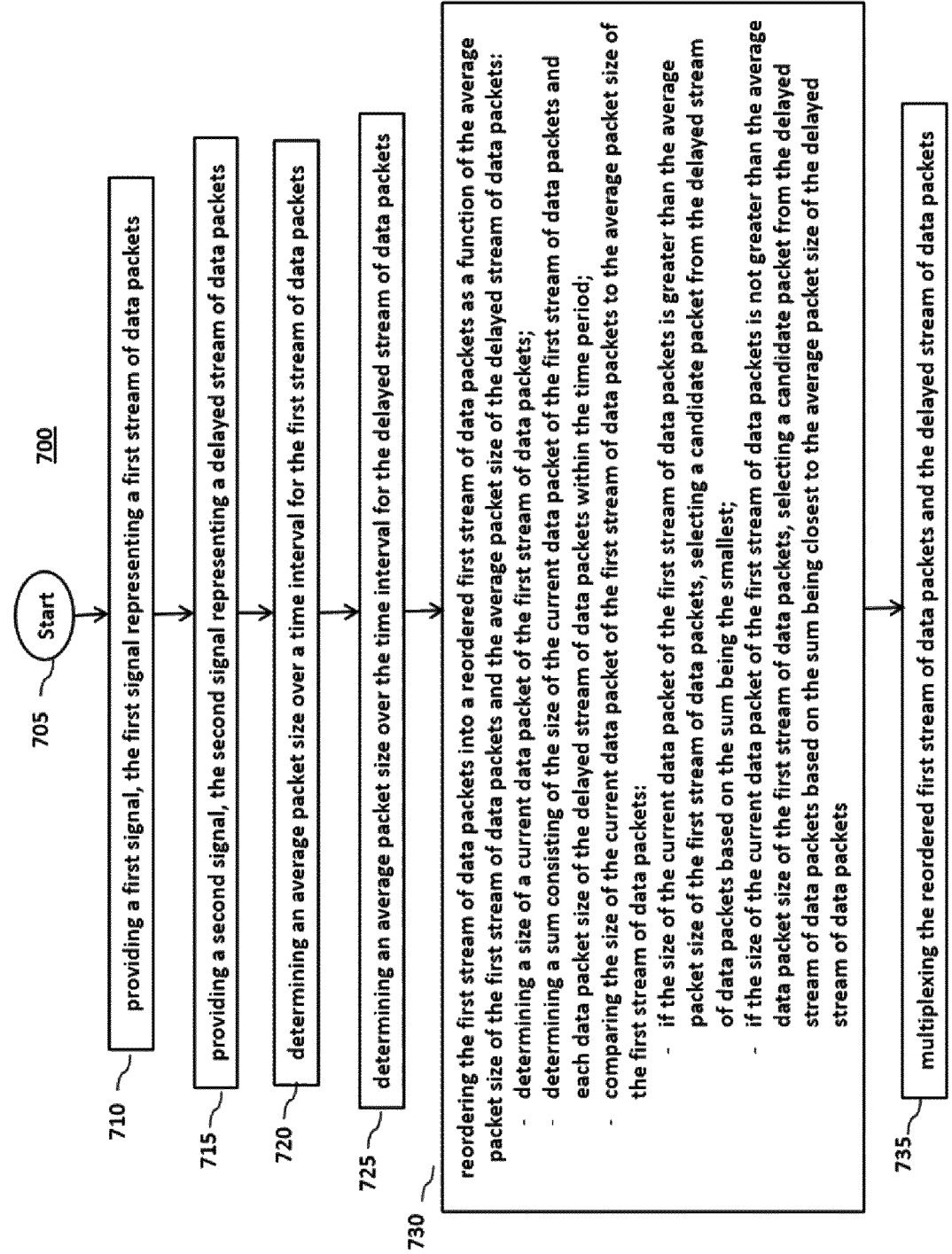
FIG. 7 illustrates an exemplary process according to the present principles.

FIG. 4 illustrates the result of an exemplary reordering process as shown e.g., in FIG. 7 according to the present principles. The inventive reordering of the staggercast stream according to the present principles will also be described in further detail later in connection with FIG. 7.

As shown in FIG. 4, the $J^{staggercast}$ packet 462 shown in the reordered staggercast stream 402R has already been reordered according to the present principles and will now be transmitted later with the $C^{base}$ packet 471-3 appearing in the delayed, base stream 403. In the prior art staggercast transmitter 100 as shown in FIG. 1, the $J^{staggercast}$ packet 462 would have been transmitted in the original packet position 451 of the original staggercast stream 402 as shown in FIG. 4.

According to another aspect of the present principles, we also define a maximum staggercast delay allowed for the newly proposed system, $T_{max}$, and set that maximum to be equal to the existing staggercast delay $T_{stag}$ 404 provided in the prior art staggercast transmitter 100, as already described above in connection with FIG. 1 and FIG. 3. Thus, $T_{max} = T_{stag}$. We also define a minimum staggercast delay $T_{min}$ and allow $T_{min}$ to be e.g., 2 packet length as shown in FIG. 4. Also, $T_{reorder}$ 405 is defined as the interval while the reordered $J^{staggercast}$ packet 462 may be selected to be transmitted. In the example as shown in FIG. 4, $J^{staggercast}$ 462 may be transmitted with $A^{base}$ 471-1, $B^{base}$ 471-2, $C^{base}$ 471-3, $D^{base}$ 471-4, $E^{base}$ 471-5, $F^{base}$ 471-6, $G^{base}$ 471-7 or $H^{base}$ 471-8. According to a reordering and selection process to be described in detail below, the best first base packet candidate during the time interval of $T_{reorder}$ would be $C^{base}$ 471-3. Therefore, the $J^{staggercast}$ packet 462 is reordered and delayed to be transmitted concurrently with $C^{base}$ 471-3 in the base stream 403, as shown in FIG. 4. Consequently, as noted above, in the original timeslot 461 when the unreordered and undelayed $J^{staggercast}$ packet 462 would have been transmitted, only $A^{base}$ 471-1 is transmitted instead.

As can be seen in FIG. 4, the range of the potential staggercast delay for $J^{staggercast}$ packet 462 is defined as $T_J$ 406, which would fall in the range of $T_{stag} > T_J > T_{min}$. Note that the list of potential candidate positions among the base stream data packets for $J^{staggercast}$ packet 462 to be transmitted concurrently is limited from $A^{base}$ 471-1 to $H^{base}$ 471-8 due to the $T_{min}$ limit that guarantees a minimal performance of the staggercast mechanism, as noted before already.

Likewise, as shown in FIG. 4, the $K^{staggercast}$ data packet 452 in the un-reordered staggercast stream 402 is encoded and ready for being transmitted. This $K^{staggercast}$ data packet 452 may be transmitted with candidates $B^{base}$, $D^{base}$, $E^{base}$, $F^{base}$, $G^{base}$, $H^{base}$ or $I^{base}$ (471-2 to 471-9). The best first base stream data packet candidate would be $B^{base}$ 471-2, again according to an exemplary reordering process to be described later. Therefore, the position of the $K^{staggercast}$ packet is unchanged and not reordered and it is transmitted with $B^{base}$ 471-2 as shown in FIG. 4. The next data packet $L^{staggercast}$ in the original un-reordered staggercast stream 402 is encoded and also ready for being transmitted. The $L^{staggercast}$ may be transmitted with one of the candidate base data packets $C^{base}$, $D^{base}$, $E^{base}$, $F^{base}$, $G^{base}$, $H^{base}$, $I^{base}$ or $J^{base}$ (471-3 to 471-10). The best first base packet candidate is $D^{base}$ 471-3, again according to an exemplary reordering process to be described later. Therefore, this reordering and selection process repeats for all of the other data packets in the staggercast stream 402 shown in FIG. 4 in accordance with the present principles.

Figure 5:
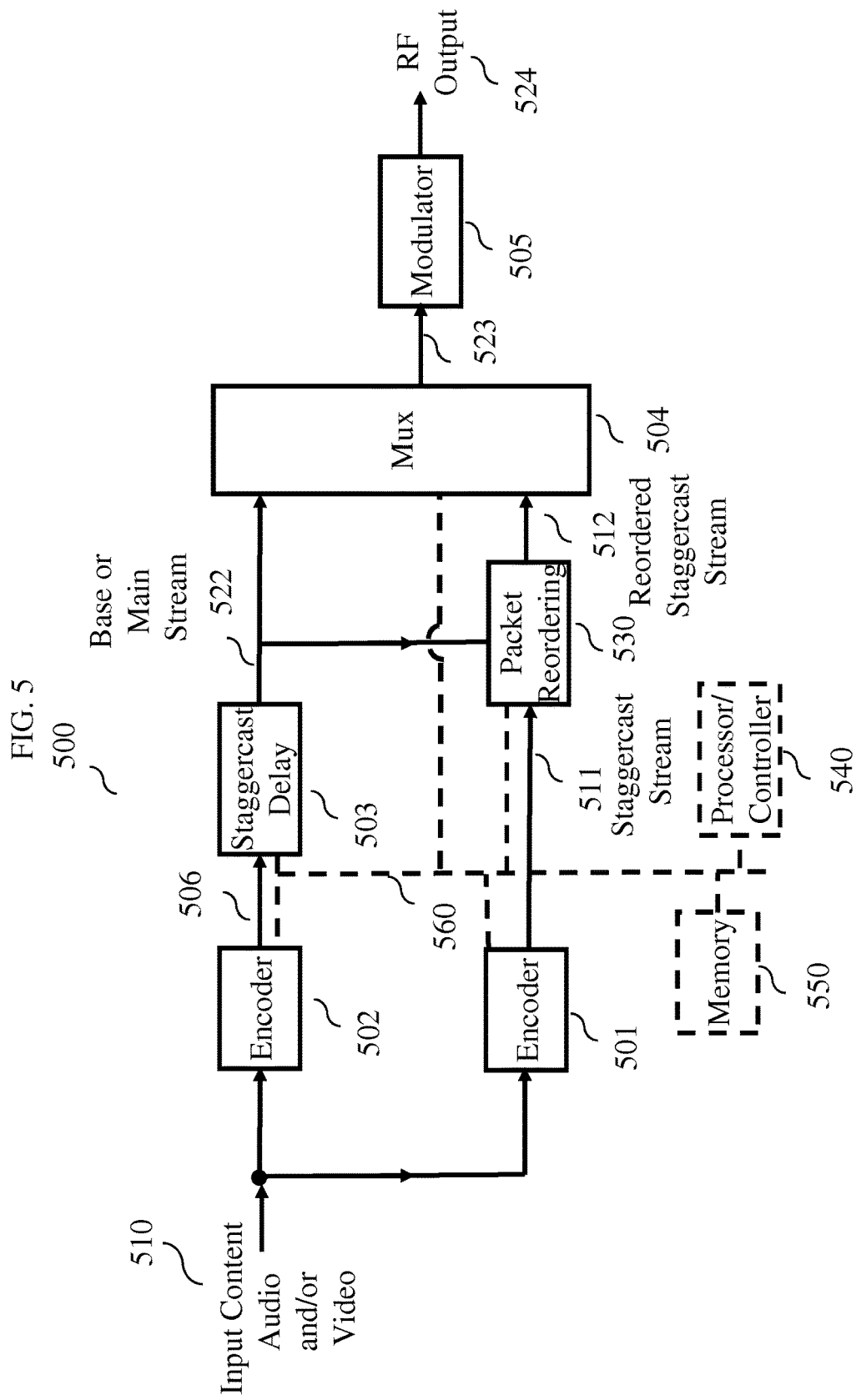
FIG. 5 illustrates an exemplary transmitter according to the present principles.

FIG. 5 shows an exemplary transmitter 500 according to the present principles. The exemplary transmitter 500 comprises a first encoder 501, a second encoder 502, a staggercast delay 503, a mux 504, and a modulator 505. These components are essentially the same as the corresponding components shown and described in FIG. 1 of a prior art staggercast transmitter 100 and therefore, they will not be further described in detail for the sake of brevity. The exemplary transmitter 500 shown in FIG. 5 additionally comprises a packet reordering unit or function 530 which performs the reordering of the original staggercast stream 511 into the reoredered staggercast stream 512 as shown in FIG. 5, and as already described above in connection with FIG. 4. The function of this reordering unit 530 will also be described in more detail below in connection with the exemplary process shown in FIG. 7.

In addition, the exemplary transmitter 500 may also comprise a processor/controller 540 and a memory 550 as shown in FIG. 5. The processor/controller 540 is provided for the processing of the various data and for controlling various functions and components 501-505, 530, and 550 of the transmitter 500. The processor/controller 540 communicates with and controls the various functions and components of the transmitter 500 via a control bus 560 as shown in FIG. 5. The memory 550 may represent both a transitory memory such as RAM, and a non-transitory memory such as a ROM, a hard drive, a CD drive, a Blu-ray drive, and/or a flash memory, for processing and storing different data, files and information as necessary, including computer program products and software (e.g., as represented by the flow chart diagram of FIG. 7, as to be discussed below), webpages, user interface information, various databases, and etc., as needed.

Figure 6:
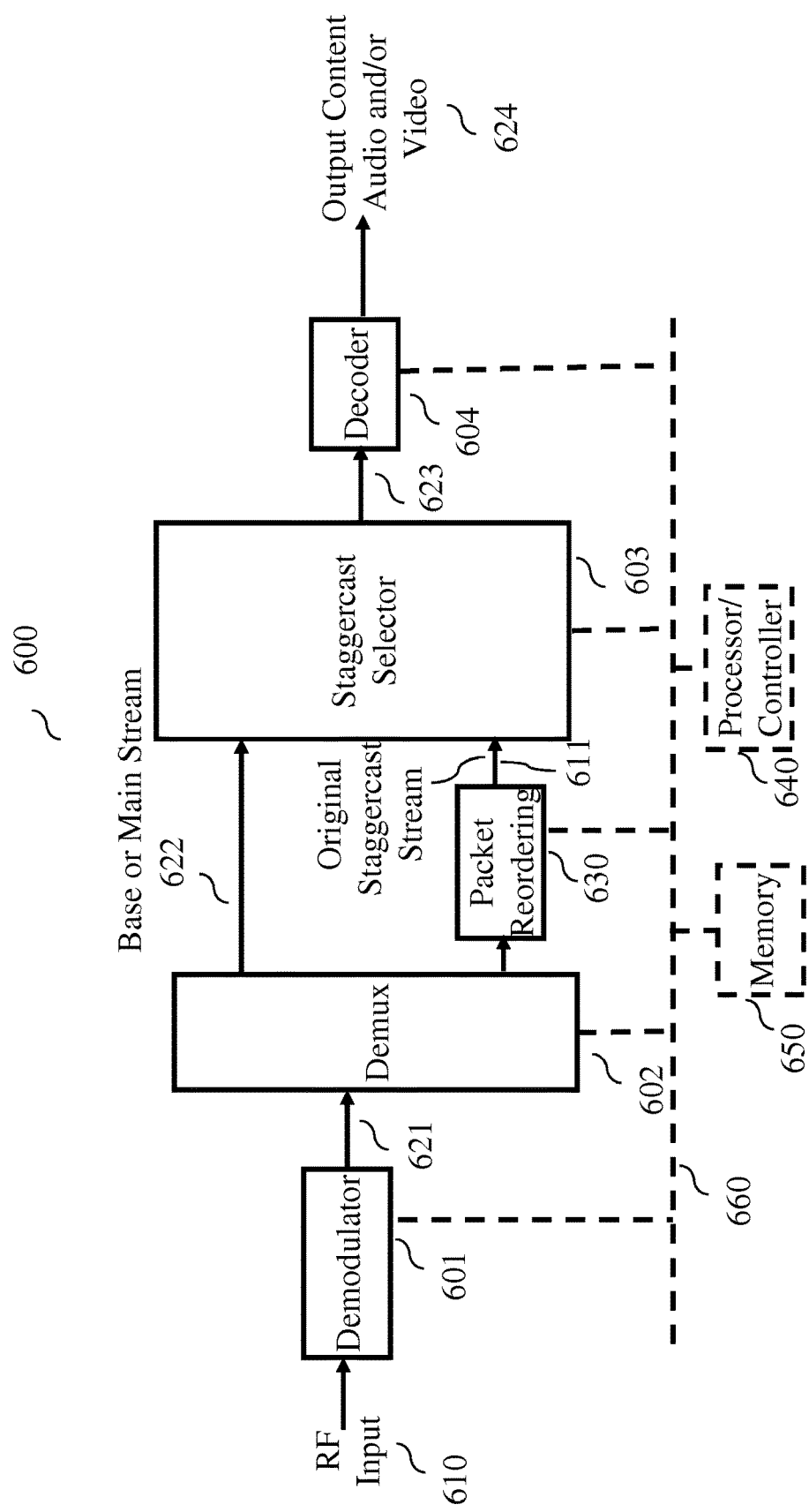
FIG. 6 illustrates an exemplary receiver according to the present principles.

FIG. 6 shows an exemplary receiver 600 according to the present principles. The exemplary receiver 600 comprises a demodulator 601, a demultiplexer 602, a staggercast selector 603, and a decoder 604. These components are essentially the same as the corresponding components shown and described in FIG. 2 of a prior art staggercast receiver 200 and therefore, they will not be further described in detail for the sake of brevity. The exemplary transmitter 600 shown in FIG. 6 additionally comprises a packet reordering unit or function 630 which performs the inverse reordering of the reordering function performed by element 530 of the transmitter 500 shown in FIG. 5. This reordering element 630 will reorder the already reordered staggercast data packets back into their original positions in the original staggercast stream 511 as shown in FIG. 5.

In addition, the exemplary receiver 600 may also comprise a processor/controller 640 and a memory 650 as shown in FIG. 6. The processor/controller 640 is provided for the processing of the various data and for controlling various functions and components 601-604, 630, and 650 of the receiver 600. The processor/controller 640 communicates with and controls the various functions and components of the receiver 600 via a control bus 660 as shown in FIG. 6. The memory 650 may represent both a transitory memory such as RAM, and a non-transitory memory such as a ROM, a hard drive, a CD drive, a Blu-ray drive, and/or a flash memory, for processing and storing different data, files and information as necessary, including computer program products and software (e.g., as represented by the flow chart diagram of FIG. 8, as to be discussed below), webpages, user interface information, various databases, and etc., as needed A person skilled in the art will appreciate that the one or more of processors/controllers 540, 640, memories 550 and 650, and control buses 560 and 650 shown in FIG. 5 and FIG. 6 may not be needed (e.g., as represented by the dashed lines and dashed enclosures), depending on the particular implementation of hardware, software and the combination thereof, as is well known in the art.

Accordingly, the present principles provide an exemplary reordering process 700 as shown in FIG. 7 for the data packets of the original staggercast stream (e.g., 402 as shown in FIG. 4 and/or 511 as shown in FIG. 5). The exemplary reordering process 700 is based on the average of the staggercast stream packet sizes, $Avg^{staggercast}$, as well as on the average of the base stream packet sizes, $Avg^{base}$, during the reordering time interval $T_{reorder}$ (e.g., shown in FIG. 4), as to be described in further detail below. These averages and other packet timing information may be obtained and updated in real-time with techniques which are well known in the art.

The exemplary process 700 shown in FIG. 7 starts at step 705. At step 710, the process 700 provides a first signal. The first signal represents a first stream of data packets that corresponds to e.g., the staggercast stream 511 shown in FIG. 5. At step 715 the process 700 provides a second signal, the second signal representing a delayed stream of data packets which correspond to, e.g., the base stream 522 shown in FIG. 5.

At step 720, an average packet size over a time interval for the first stream of data packets is determined, this average packet size is denoted as $Avg^{staggercast}$ as previously described above. Also, this time interval is e.g., $T_{reorder}$, also as previously described above in connection with FIG. 4. Likewise, at step 725, an average packet size over the same time interval is also determined for the delayed stream of data packets which are the base stream data packets 522 shown in FIG. 5. This average packet size is denoted as $Avg^{base}$ as previously described above. At step 730, the first stream of data packets are reordered into a reordered first stream of data packets as a function of the average packet size of the first stream of data packets, $Avg^{staggercast}$, and the average packet size of the delayed stream of data packets, $Avg^{base}$. The reordered first stream of data packets are shown e.g., as 512 of FIG. 5.

As shown at step 730 in FIG. 7, the exemplary reordering process 700 further comprises several additional sub steps in order to identify the best candidate base stream data packet for the concurrent transmission of the current staggercast data packet. The exemplary process 700 according to the present principles determines a size of a current data packet in the first, staggercast stream of data packets. The process 700 then determines a sum consisting of the size of the current data packet of the first, staggercast stream of data packets and each data packet size of the delayed, base stream of data packets within the time interval. The process 700 then compares the size of the current data packet of the first stream of data packets to the average packet size of the first stream of data packets, $Avg^{staggercast}$.

As shown at step 730 of FIG. 7, if the size of the current data packet of the first stream of data packets is greater than the average packet size of the first stream of data packets, $Avg^{staggercast}$, then the process 700 selects a candidate packet from the delayed, base stream data packets based on the sum being the smallest. On the other hand, if the size of the current data packet of the first stream of data packets is not greater than the average data packet size of the first stream of data packets, $Avg^{staggercast}$, then the process 700 selects a candidate packet from the delayed, base stream of data packets based on the sum being closest to the average packet size of the delayed, base stream of data packets, $Avg^{base}$.

At step 735 of FIG. 7, the process 700 then multiplexes the reordered first stream of data packets and the delayed, base stream of data packets for transmission, using, e.g., the modulator 505 shown in FIG. 5.

Figure 8:
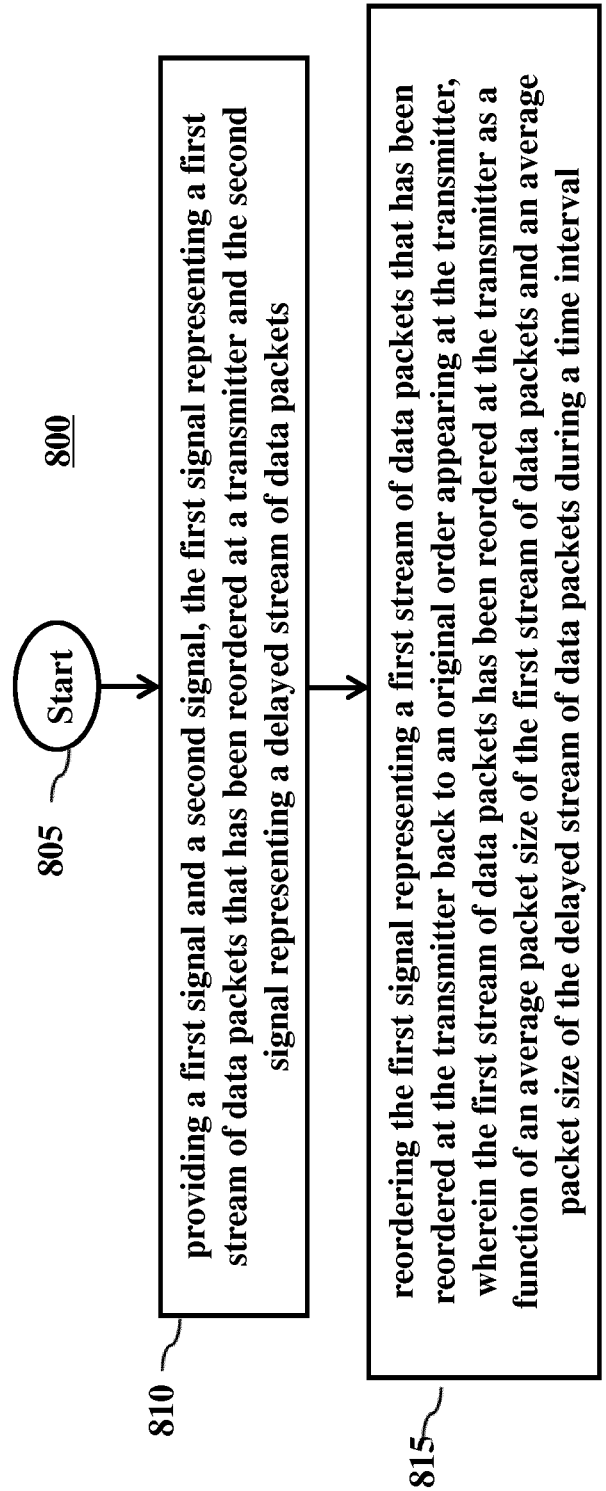
FIG. 8 illustrates another exemplary process according to the present principles.

FIG. 8 illustrates another exemplary process performed by e.g., an exemplary receiver 600 according to the present principles. The exemplary process 800 shown in FIG. 8 starts at step 805. At step 810 of FIG. 8, the method provides a first signal and a second signal, the first signal representing a first stream of data packets that has been reordered at a transmitter and the second signal representing a delayed stream of data packets. At step 815, the method reorders the first signal representing a first stream of data packets that has been reordered at the transmitter back to an original order appearing at the transmitter. The first stream of data packets has been reordered at the transmitter as a function of the average packet size of the first stream of data packets and the average packet size of the delayed stream of data packets during a time interval.

According to an exemplary embodiment of the present principles, a packet sequence number is provided in the packet header of the staggercast stream 511 so that the reordering performed in packet reordering element 530 in the exemplary transmitter 500 of FIG. 5 may be reversed by the inverse reordering function performed by the packet reordering element 630 in the exemplary receiver 600 shown in FIG. 6. If the reordering process is performed on the transport level, for example, existing timestamping or sequence numbers in the MPEG 2 systems transport packets may be used. If however, for example, the reordering process is performed on the lower level, i.e. audio, video or data, then a new packet stamping or a sequence number may be added.

In view of the above, the foregoing merely illustrates the present principles applying to staggercast communication apparatuses, methods, and computer instructions stored in a non-transitory computer medium. It will thus be appreciated that those skilled in the art will be able to devise numerous alternative arrangements which, although not explicitly described herein, embody the present principles and are within its scope. It is also therefore to be understood that numerous modifications may be made to the illustrative embodiments and that other arrangements may be devised without departing from the scope of the present principles as defined by the appended claims.

The invention claimed is:

1. An apparatus comprising:
an encoder configured to provide a first signal, the first signal representing a first stream of data packets;
a delay circuit configured to provide a second signal, the second signal representing a delayed stream of data packets;
a processor configured to determine an average packet size over a time interval for the first stream of data packets and an average packet size over the time interval for the delayed stream of data packets;
a multiplexer configured to multiplex a reordered first stream of data packets and the delayed stream of data packets; and
wherein the first stream of data packets is reordered into the reordered first stream of data packets as a function of the average packet size of the first stream of data packets and the average packet size of the delayed stream of data packets.

2. The apparatus of claim 1 wherein first stream of data packets is reordered into the reordered first stream of data packets by further determining a size of a current data packet of the first stream of data packets.

3. The apparatus of claim 2 wherein the first stream of data packets is reordered into the reordered first stream of data packets by further determining a sum consisting of the size of the current data packet of the first stream of data packets and each data packet size of the delayed stream of data packets within the time interval.

4. The apparatus of claim 3 wherein the first stream of data packets is reordered into the reordered first stream of data packets by further comparing the size of the current data packet of the first stream of data packets to the average packet size of the first stream of data packets.

5. The apparatus of claim 4 wherein the first stream of data packets is reordered into the reordered first stream of data packets by further, if the size of the current data packet of the first stream of data packets is greater than the average packet size of the first stream of data packets, selecting a candidate packet from the delayed stream of data packets based on the sum being the smallest.

6. The apparatus of claim 4 wherein the first stream of data packets is reordered into the reordered first stream of data packets by further, if the size of the current data packet of the first stream of data packets is not greater than the average data packet size of the first stream of data packets, selecting a candidate packet from the delayed stream of data packets based on the sum being closest to the average packet size of the delayed stream of data packets.

7. The apparatus of claim 1 wherein the data packets represent one or more of: 1) audio content, 2) video content.

8. The apparatus of claim 1 wherein the second signal is a signal provided by another encoder and delayed by a staggercast delay.

9. A method comprising:
providing a first signal, the first signal representing a first stream of data packets;
providing a second signal, the second signal representing a delayed stream of data packets;
determining an average packet size over a time interval for the first stream of data packets;
determining an average packet size over the time interval for the delayed stream of data packets;
reordering the first stream of data packets into a reordered first stream of data packets as a function of the average packet size of the first stream of data packets and the average packet size of the delayed stream of data packets; and
multiplexing the reordered first stream of data packets and the delayed stream of data packets.

10. The method of claim 9 wherein the reordering the first stream of data packets into the reordered first stream of data packets further comprising determining a size of a current data packet of the first stream of data packets.

11. The method of claim 10 wherein the reordering the first stream of data packets into the reordered first stream of data packets further comprising determining a sum consisting of the size of the current data packet of the first stream of data packets and each data packet size of the delayed stream of data packets within the time interval.

12. The method of claim 9 wherein the data packets represent one or more of: 1) audio content, 2) video content.

13. A computer program product stored in a non-transitory computer-readable storage medium, comprising computer-executable instructions for:
providing a first signal, the first signal representing a first stream of data packets;
providing a second signal, the second signal representing a delayed stream of data packets;
determining an average packet size over a time interval for the first stream of data packets;
determining an average packet size over the time interval for the delayed stream of data packets;
reordering the first stream of data packets into a reordered first stream of data packets as a function of the average packet size of the first stream of data packets and the average packet size of the delayed stream of data packets; and
multiplexing the reordered first stream of data packets and the delayed stream of data packets.

14. An apparatus comprising:
a demultiplexer configured to provide a first signal and a second signal, the first signal representing a first stream of data packets that has been reordered at a transmitter and the second signal representing a delayed stream of data packets; and
a packet reordering unit configured to reorder the first signal representing a first stream of data packets that has been reordered at the transmitter back to an original order appearing at the transmitter, wherein the first stream of data packets has been reordered at the transmitter as a function of an average packet size of the first stream of data packets and an average packet size of the delayed stream of data packets during a time interval.

15. A method performed by a receiver comprising:
providing a first signal and a second signal, the first signal representing a first stream of data packets that has been reordered at a transmitter and the second signal representing a delayed stream of data packet; and
reordering the first signal representing a first stream of data packets that has been reordered at the transmitter back to an original order appearing at the transmitter, wherein the first stream of data packets has been reordered at the transmitter as a function of an average packet size of the first stream of data packets and an average packet size of the delayed stream of data packets during a time interval.

* * * * *